(12) United States Patent
Kaneko

(10) Patent No.: US 10,493,709 B2
(45) Date of Patent: Dec. 3, 2019

(54) TIRE MOLDING ELEMENT, TIRE VULCANIZATION MOLD, AND TIRE

(71) Applicant: COMPAGNIE GENERALE DES ETABLISSEMENTS MICHELIN, Clermont-Ferrand (FR)

(72) Inventor: Shuichi Kaneko, Tokyo (JP)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 98 days.

(21) Appl. No.: 15/563,384

(22) PCT Filed: Mar. 17, 2016

(86) PCT No.: PCT/JP2016/058530
§ 371 (c)(1),
(2) Date: Sep. 29, 2017

(87) PCT Pub. No.: WO2016/158459
PCT Pub. Date: Oct. 6, 2016

(65) Prior Publication Data
US 2018/0086015 A1    Mar. 29, 2018

(30) Foreign Application Priority Data
Mar. 31, 2015   (WO) ................ PCT/JP2015/060180

(51) Int. Cl.
*B29D 30/06*   (2006.01)
*B29C 33/02*   (2006.01)
(Continued)

(52) U.S. Cl.
CPC .......... *B29D 30/0606* (2013.01); *B29C 33/02* (2013.01); *B29C 35/02* (2013.01);
(Continued)

(58) Field of Classification Search
CPC ............ B29D 30/0606; B29D 30/0662; B29D 2030/0613; B29D 2030/685
See application file for complete search history.

(56) References Cited

U.S. PATENT DOCUMENTS 5,095,963 A * 3/1992 Maitre ............... B29D 30/0606
152/209.18
9,149,995 B2 * 10/2015 Duvernier .......... B29D 30/0606
(Continued)

FOREIGN PATENT DOCUMENTS

JP   10-080923    3/1998
JP   2005-262973  9/2005
(Continued)

*Primary Examiner* — James P Mackey
(74) *Attorney, Agent, or Firm* — Dickinson Wright PLLC

(57) ABSTRACT

A tire molding element for vulcanization molding a tire tread is disclosed herein. The tire includes at least one thin plate including a protrusion which protrudes from the main body in the thickness direction of the thin plate and guides the cut covering layer in the depth direction of the green tire in such a way as to cover at least a portion of the transverse side surface of the ground contact element, and the at least one thin plate comprises at least two cutting means separated in the thickness direction of the at least one thin plate, at an end portion on the opposite side to the molding surface.

4 Claims, 6 Drawing Sheets

(51) Int. Cl.
    *B29C 35/02*         (2006.01)
    *B60C 11/00*         (2006.01)
    *B60C 11/03*         (2006.01)
    *B60C 11/12*         (2006.01)
    *B29D 30/68*         (2006.01)

(52) U.S. Cl.
    CPC .............. *B60C 11/00* (2013.01); *B60C 11/03* (2013.01); *B60C 11/12* (2013.01); *B29D 2030/0613* (2013.01); *B29D 2030/685* (2013.01)

(56) References Cited

U.S. PATENT DOCUMENTS

| | | | |
|---|---|---|---|
| 9,421,725 B2* | 8/2016 | Ohashi | B29D 30/68 |
| 9,643,456 B2* | 5/2017 | Kaneko | B60C 11/03 |
| 2005/0109438 A1 | 6/2005 | Collete et al. | |
| 2009/0159167 A1 | 6/2009 | Scheuren | |
| 2012/0048439 A1 | 3/2012 | Christenbury | |
| 2014/0348968 A1 | 11/2014 | Duvernier et al. | |
| 2015/0104533 A1 | 4/2015 | Duvernier et al. | |
| 2015/0328934 A1 | 11/2015 | Kaneko | |
| 2016/0136909 A1 | 5/2016 | Ohashi | |

FOREIGN PATENT DOCUMENTS

| | | |
|---|---|---|
| WO | 03/089257 | 10/2003 |
| WO | 2014-198654 A1 | 12/2014 |
| WO | 2013/088570 | 4/2015 |

* cited by examiner

TIRE MOLDING ELEMENT, TIRE VULCANIZATION MOLD, AND TIRE

CROSS-REFERENCE TO RELATED APPLICATIONS

This application is a 371 national phase entry of PCT/JP2016/058530, filed 17 Mar. 2016, which claims the benefit of International Patent Application No. PCT/JP2015/060180, filed 31 Mar. 2015, the contents of which are incorporated herein by reference for all purposes.

BACKGROUND

The present disclosure relates to a tire molding element, a tire vulcanization mold comprising said molding element, and a tire vulcanization-molded by means of said mold.

A tire tread has been proposed in WO 03/089257 and WO 2013/088570, for example, in which a covering layer comprising a material different than the rubber composition forming the main portion of a ground contact element is used in order to cover a part or all of the ground contact element, with the aim of improving specific performance, among various aspects of performance which are required in a tire.

A tire molding element has been proposed in order to form this kind of tire tread, wherein a blade is provided between two thin plates having a cutting means for cutting the covering layer arranged on an unvulcanized green tire, and the covering layer is arranged on a transverse side surface of the blade.

A tire molding element has also been proposed with the aim of reducing stress in a deep portion of a ground contact element when the tire is rolling, the stress being due to the presence of a covering layer, wherein a bulge is provided on an end portion of a thin plate and a cutting means protrudes from the bulge.

Furthermore, a molding element for a tire vulcanization mold has been proposed in which a covering layer is arranged at a predetermined position on a side surface of thin plates without the use of a blade for arranging the covering layer, by providing a protrusion that protrudes in the thickness direction of the thin plates

SUMMARY

With the tire molding elements described in the Background, however, it is necessary to provide a blade between two thin plates so there is a problem in that the degree of freedom in arranging the covering layer is reduced.

Furthermore, with the tire molding element described in Patent Document 3, slipping is produced with the cutting means for reasons such as the toughness of the material of the covering layer, which cannot be cut to a predetermined length, and the covering layer cannot be simultaneously cut by the cutting means, and as a result there are problems in that the covering layer is likely to be roiled up on either of the thin plates and there is a risk of instability in the arrangement of the covering layer.

The present disclosure has been devised in order to solve the abovementioned problems in the prior art, and the aim thereof lies in providing a tire molding element which enables a covering layer to be arranged at a predetermined position with greater stability on a ground contact element of a tire, while enabling a greater degree of freedom in the arrangement of the covering layer, and also in providing a tire vulcanization mold comprising said molding element, and a tire vulcanization-molded by means of said mold.

In the present specification, the term "green tire" refers to an article in which a plurality of strip-like or sheet-like semifinished rubber products or semifinished non-rubber products comprising or not comprising a reinforcing material are laminated in order to obtain a vulcanization-molded tire using a mold (die).

The term "mold" means a collection of separate molding elements which are arranged close together so as to define a toroidal molding space.

The term "molding element" means a portion of a mold, e.g., a mold segment.

The term "molding surface" means a mold surface intended for molding a tire tread.

Furthermore, the term "thin plate" means a plate-like protrusion that protrudes in order to mold an incision in a tire tread. The thickness of the thin plate in the vicinity of the molding surface is a maximum of around 2 mm; the incision molded in the tread by means of the thin plate is also referred to as a "sipe", and this "sipe" may also be partially closed off within the ground contact surface.

The term "cutting means" means a projecting portion that projects from the thin plate or the molding surface, and this projecting portion is able to cut the covering layer that covers the green tire.

In order to achieve the abovementioned aim, the present disclosure provides a molding element for vulcanization molding a tire tread, characterized in that the molding element comprises: a molding surface for molding a plurality of ground contact elements of the tread, comprising a ground contact surface which contacts a road surface, and a transverse side surface and a circumferential side surface connected to said ground contact surface; and thin plates comprising a main body, provided in such a way as to cut a covering layer arranged in advance on an unvulcanized green tire, at least one thin plate comprises a protrusion which protrudes from the main body in the thickness direction of the thin plate and guides the cut covering layer in the depth direction of the green tire in such a way as to cover at least a portion of the transverse side surface of the ground contact element, and the thin plates comprise at least two cutting means (7) separated in the thickness direction of the thin plates, at an end portion on the opposite side to the molding surface.

According to the present disclosure having the configuration described above, thin plates comprising a main body are provided with a protrusion that protrudes from the main body of said thin plates in the thickness direction of the thin plates, said thin plates being provided in such a way as to cut a covering layer without the use of the blade described in abovementioned Patent Documents 1 and 2 etc., so the cut covering layer arranged in advance on an unvulcanized green tire is guided in the green tire depth direction by means of the protrusion on the thin plates, and therefore it is possible to increase the degree of freedom in the arrangement of the covering layer that covers a ground contact element on a tire.

In addition, according to the present disclosure, when the covering layer arranged on the green tire is cut by the at least two cutting means separated in the thickness direction of the thin plates and provided at an end portion of the thin plates on the opposite side to the molding surface, it is possible to make slipping unlikely to occur between the covering layer and the cutting means, so it is possible to cut the covering layer more reliably to a predetermined length, and it is furthermore possible to reduce the risk of the covering layer being dragged by the thin plate on the wrong side, and therefore the covering layer can be stably arranged at a predetermined position with greater reliability.

According to the present disclosure, the thin plates preferably further comprise an enlarged-width portion at the end portion on the opposite side to the molding surface, and the cutting means protrude from the enlarged-width portion.

According to the present disclosure having the configuration described above, the cutting means protrude from the enlarged-width portion provided at the end portion of the thin plates on the opposite side to the molding surface, and therefore it is possible to maintain a distance between the at least two cutting means which are separated in the thickness direction of the thin plates and it is possible to make slipping unlikely to occur between the covering layer and the cutting means; as a result the covering layer can be stably arranged at a predetermined position on the ground contact element of the tire. Furthermore, it is a simple matter to make a large number of cutting means protrude, namely three or more cutting means, because the enlarged-width portion is provided on the thin plates.

According to the present disclosure, the enlarged-width portion of the thin plates preferably protrudes in the opposite direction to the direction of protrusion of the protrusion from the main body of the thin plates.

According to the present disclosure having the configuration described above, the enlarged-width portion of the thin plates protrudes in the opposite direction to the direction of protrusion of the protrusion from the main body of the thin plates, and therefore it is possible to reliably guide the cut covering layer to a deep position in the depth direction of the green tire without said covering layer being obstructed by the enlarged-width portion, and also to reliably guide the covering layer to the protrusion of the thin plates; as a result the covering layer can be stably arranged at a predetermined position on the ground contact element of the tire, with greater reliability.

According to the present disclosure, the maximum separation distance of the two cutting means of the thin plates, in the thickness direction of the thin plates, is preferably equal to or less than the width of the enlarged-width portion.

According to the present disclosure having the configuration described above, the maximum separation distance of the two cutting means of the thin plates, in the thickness direction of the thin plates, is equal to or less than the width of the enlarged-width portion, and therefore the covering layer can be stably arranged at a predetermined position on the ground contact element of the tire, with greater reliability. That is to say, if the maximum separation distance of the two cutting means of the thin plates, in the thickness direction of the thin plates, is greater than the width of the enlarged-width portion, there is a greater risk of the cutting means producing slipping with the covering layer, so it becomes more difficult to cut the covering layer to a predetermined length, and therefore the maximum separation distance of the cutting means is preferably equal to or less than the width of the enlarged-width portion.

According to the present disclosure, the maximum width of the enlarged-width portion along the thickness direction of the thin plates is preferably between 1.5 and 5 times the thickness of the thin plates.

According to the present disclosure having the configuration described above, the maximum width of the enlarged-width portion along the thickness direction of the thin plates is between 1.5 and 5 times the thickness of the thin plates, and therefore a tire in which a part or all of the ground contact element is covered by the covering layer can be molded more stably. That is to say, if the maximum width of the enlarged-width portion is more than five times the thickness of the thin plates, then it becomes difficult to separate the thin plates provided with the enlarged-width portion from the tire after vulcanization molding, and there is a risk of damaging the molding element; furthermore, if the maximum width of the enlarged-width portion is less than 1.5 times the thickness of the thin plates, then the advantage of providing the enlarged-width portion in the incision when the tire is molded is reduced, and there is a risk of it not being possible to adequately demonstrate tire performance, so the maximum width of the enlarged-width portion of the thin plates is preferably in the abovementioned range.

According to the present disclosure, the cross-sectional shape of the protrusion of the thin plates is preferably substantially triangular.

According to the present disclosure having the configuration described above, the thin plates provided with the protrusion are easily separated from the tire after vulcanization molding, and as a result it is possible to mold a tire in which a part or all of the ground contact element is covered by the covering layer, with greater stability.

Advantage of the Disclosure

By virtue of the tire molding element, tire vulcanization mold, and tire of the present disclosure, it is possible to arrange a covering layer at a predetermined position on a ground contact element of the tire with greater stability, while enabling a greater degree of freedom in the arrangement of the covering layer.

DETAILED DESCRIPTION

A tire molding element, a tire vulcanization mold comprising said molding element, and a tire vulcanization-molded by means of said mold in accordance with a preferred mode of embodiment of the present disclosure will be described below with reference to the appended drawings.

A tire molding element, a tire vulcanization mold comprising said molding element, and a tire vulcanization-molded by means of said mold according to a first mode of embodiment of the present disclosure will be described first of all with the aid of FIG. 1 to FIG. 8.

Figure 1:
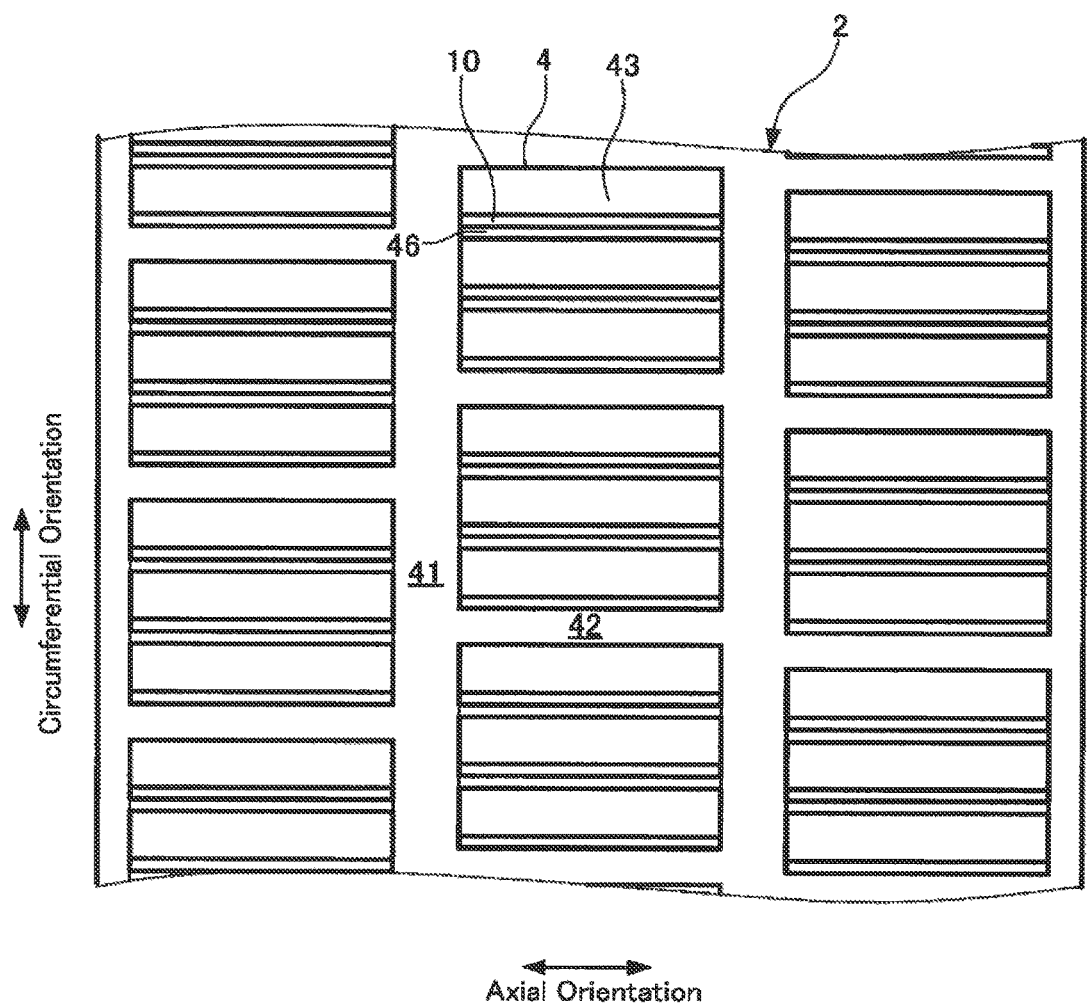
FIG. 1 schematically illustrates a portion of the surface of a tire tread molded by means of a tire molding element according to a first mode of embodiment of the present disclosure.
Figure 2:
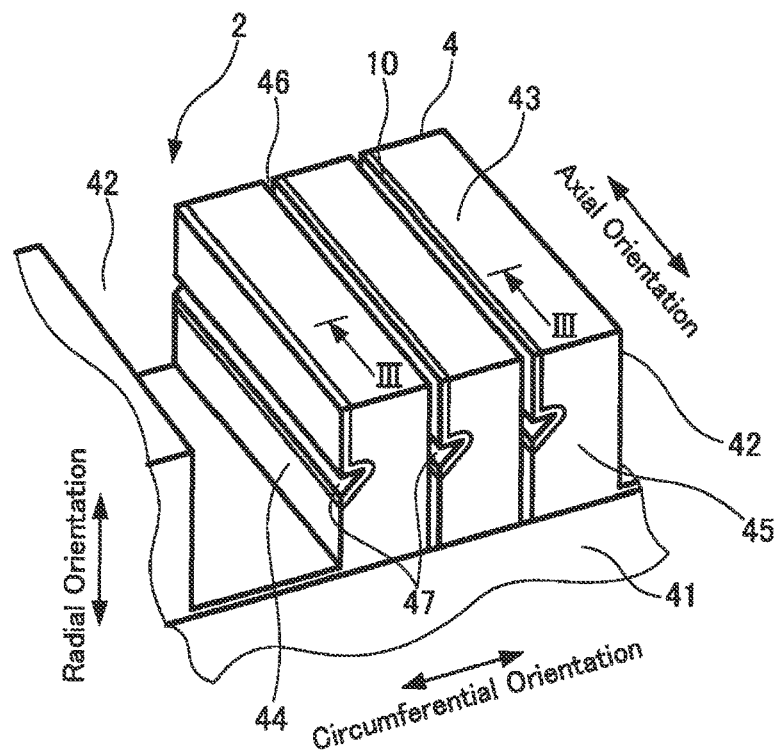
FIG. 2 is an oblique view schematically illustrating a portion of a ground contact element of the tire tread in FIG. 1.
Figure 3:
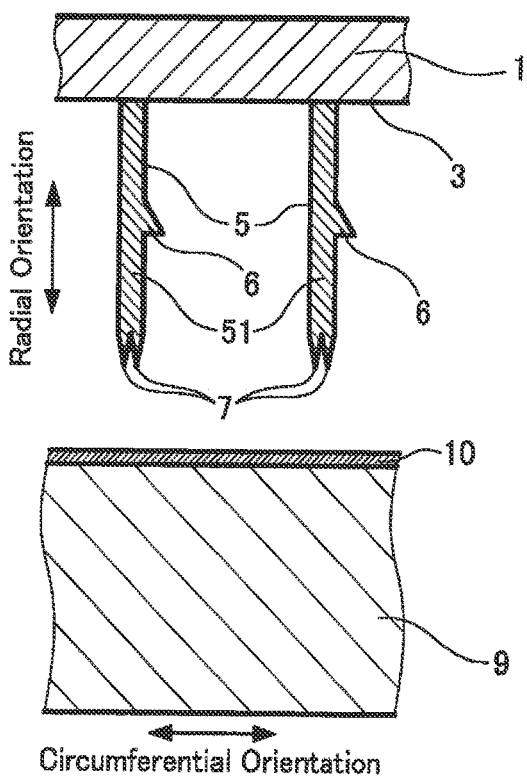
FIG. 3 is a view in cross section schematically illustrating a green tire on which a covering layer is arranged, and a tire molding element according to a first mode of embodiment of the present disclosure, corresponding to a portion along the line III-III in FIG. 2 and provided in such a way as to mold the tire tread in FIG. 2.
Figure 4:
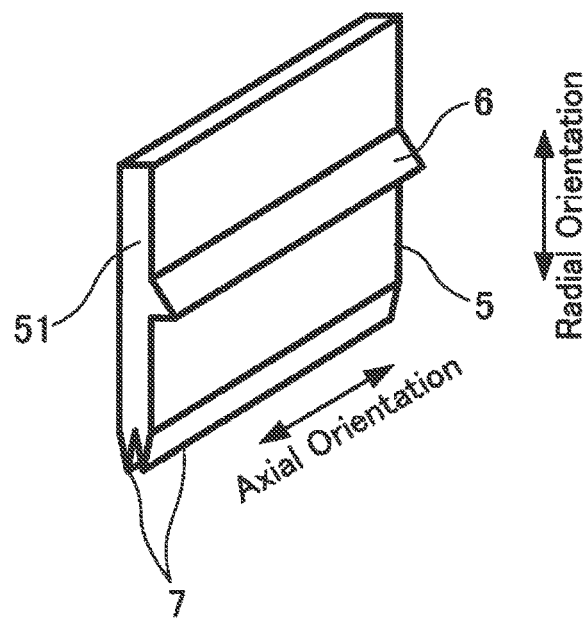
FIG. 4 is an oblique view schematically illustrating a thin plate of the tire molding element in FIG. 3.
Figure 5:
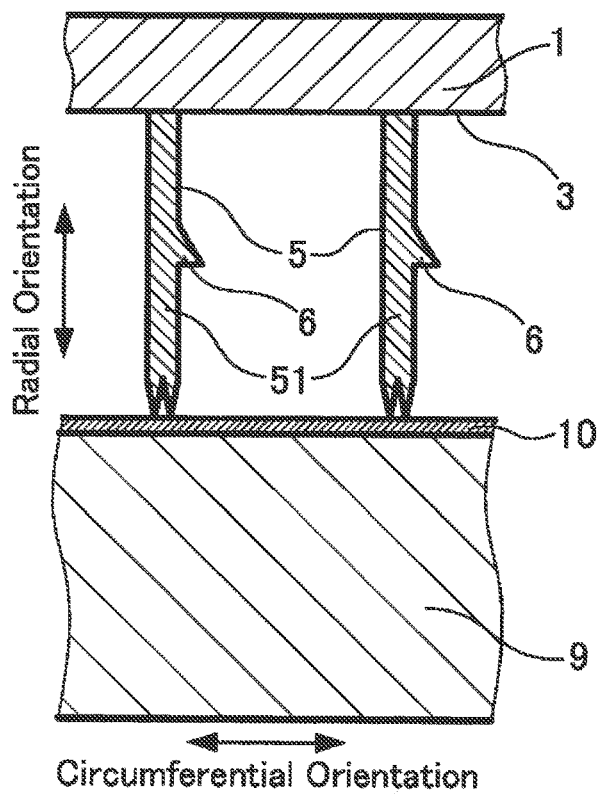
FIG. 5 is a view in cross section of a tire molding element and a green tire, schematically illustrating a step of the molding employing the tire molding element in FIG. 3.

FIG. 1 schematically illustrates a portion of the surface of a tire tread molded by means of the tire molding element according to a first mode of embodiment of the present disclosure; FIG. 2 is an oblique view schematically illustrating a portion of a ground contact element of the tire tread in FIG. 1; FIG. 3 is a view in cross section schematically illustrating a green tire on which a covering layer is arranged, and a tire molding element according to a first mode of embodiment of the present disclosure, corresponding to a portion along the line III-III in FIG. 2 and provided in such a way as to mold the tire tread in FIG. 2; FIG. 4 is an oblique view schematically illustrating a thin plate of the tire molding element in FIG. 3; and FIG. 5 to FIG. 8 are views in cross section of a tire molding element and a green tire, schematically illustrating a step of the molding employing the tire molding element in FIG. 3. Here, in FIG. 1 to FIG. 8, the direction of the arrows indicated by Circumferential Orientation denotes the tire circumferential direction (direction of rotation), the direction of the arrows indicated by Axial Orientation denotes the tire axial direction (tire transverse direction), and the direction of the arrows indicated by Radial Orientation denotes the tire radial direction.

As illustrated in FIGS. 1 and 2, a plurality of ground contact elements 4 are formed on a tire tread 2, said plurality of ground contact elements 4 being defined by a plurality of circumferential grooves 41 extending in the tire circumferential direction and a plurality of transverse grooves 42 extending in the tire axial direction (tire transverse direction).

The ground contact elements 4 comprise: a ground contact surface 43 which contacts a road surface when the tire is rolling, and a plurality of transverse side surfaces 44 extending in a transverse direction and a plurality of circumferential side surfaces 45 extending in a circumferential direction, connected to the ground contact surface 43, further comprises two incisions 46 opening in the ground contact surface 43 and the circumferential grooves 41 and extending inwardly in the tire radial direction and in the tire axial direction (tire transverse direction). Here, side surfaces of the incisions 46 extending in the tire radial direction also constitute the transverse side surfaces 44 of the ground contact element 4. A notch 47 is provided in the region of an intermediate portion in the radial direction of one transverse side surface of the incisions 46, and one transverse side surface of the incisions 46 in a range from the notch 47 to the ground contact surface 43, also including a portion of the ground contact surface 43, is covered by a covering layer 10 comprising a different material than that of the ground contact element 4, intended to improve specific tire performance. Moreover, as illustrated in FIG. 2, the covering layer 10 is provided only on the transverse side surface 44 in a single direction (specifically the "front side") with respect to the tire rotation direction.

The molding element for molding the tread 2 in FIG. 2 will be described next with the aid of FIG. 3 and FIG. 4.

As illustrated in FIG. 3, a molding surface 3 intended for molding the tread 2 is provided on a surface of the molding element 1 opposite a green tire 9 vulcanization molded as a tire by means of the molding element 1. Thin plates 5 extending in the radial direction toward the green tire 9 for forming the incisions 46 in the ground contact elements 4 are provided on the molding surface 3. The thin plates 5 comprise a main body 51 and a protrusion 6 having a substantially triangular cross section is provided in the region of an intermediate portion in the radial direction of the main body 51 of the thin plates 5, said protrusion 6 forming the notch 47 in the ground contact element 4, protruding in the thickness direction (tire circumferential direction) of the thin plates 5, and being intended to guide a cut covering layer 10 in the depth direction of the green tire 9 so that the covering layer 10 covers a part or all of the transverse side surface 44 of the ground contact element 4; two cutting means 7 separated in the thickness direction of the thin plates 5 and provided in such a way as to cut the covering layer 10 arranged in advance on the unvulcanized green tire 9 are further provided at an end portion of the thin plates 5 on the opposite side to the molding surface 3. The thin plates 5 and the main body 51 thereof have a flat plate shape extending linearly in the width direction (tire axial direction) of the thin plates 5, as illustrated in FIG. 4. It should be noted that the cutting means 7 are not limited to two cutting means, and three or more may be provided.

Examples of materials which may be used as the covering layer 10 include a composition (including a rubber composition) based on a natural resin having a higher elastic modulus than the elastic modulus of the rubber composition which is the constituent material of the ground contact element 4, a material in which fibers are mixed or impregnated with a composition based on a natural resin, a thermoplastic resin, and a laminate or mixture thereof; it is also possible to use a combination of a nonwoven fabric or woven fabric etc. impregnated with a composition based on a natural resin, with the aim of providing further reinforcement or improving adhesion with the ground contact element 4. A fibrous material such as a nonwoven fabric or woven fabric impregnated with a composition based on a natural resin may be used alone as the covering layer 10. According to this mode of embodiment, the rubber composition has a dynamic shear complex modulus (dynamic shear modulus: G*) when subjected to a maximum shear stress of 0.7 MPa at a frequency of 10 Hz and a temperature of −10° C. in excess of 200 MPa, and preferably in excess of 300 MPa, with the aim of improving the performance on snow. The storage elastic modulus represented by G' and the loss elastic modulus represented by G", which are dynamic properties known to a person skilled in the art, are measured by means of a viscosity analyzer (viscoanalyzer: Metravib VB4000) using a test piece molded from the raw composition or a test piece which is combined with the composition after vulcanization. The test piece which is used is described in Figure X2.1 (a circular method) of the standard ASTM D 5992-96 (version published September 2006, initially approved in 1996). The diameter "d" of the test piece is 10 mm (consequently the test piece has a circular cross section of 78.5 mm$^2$), the thickness "L" of each part of the rubber compound is 2 mm, and the ratio "d/L" is 5 (described in paragraph X2.4 of the ASTM standard, unlike the ratio "d/L" of 2 recommended in the standard ISO 2856). The test involves recording the response of a test piece comprising a vulcanized rubber composition subjected to a simple alternating sinusoidal shear load at a frequency of 10 Hz. The maximum shear stress reached during the test is 0.7 MPa.

The measurement is taken by varying the temperature from Tmin, which is a temperature lower than the glass transition temperature (Tg) of the rubber material, to a maximum temperature Tmax in the vicinity of 100° C., at a rate of 1.5° C. per minute. The test piece is stabilized for approximately 20 minutes at Tmin prior to the start of the test in order to obtain a satisfactory uniformity of temperature within the test piece. The results obtained are the storage elastic modulus (G') and the loss elastic modulus (G") at the prescribed temperature. The complex elastic modulus G* is defined in terms of the absolute values of the storage elastic modulus and the loss elastic modulus using the following formula:

$$G^* = \sqrt{G'^2 + G''^2}$$ [Numerical Formula 1]

Molding of the tire tread using the tire molding element according to this mode of embodiment will be described next with the aid of FIG. 5 to FIG. 8. As a first step illustrated in FIG. 5, the two cutting means 7 of the thin plates 5 provided on the molding element 1 according to this mode of embodiment, which are provided in such a way as to protrude in the radial direction from the end portion on the opposite side to the molding surface 3 toward the green tire 9 and in such a way as to cut the covering layer 10 arranged in advance on the unvulcanized green tire 9, are placed in contact with the covering layer 10, and the covering layer 10 is cut to a predetermined length by the two adjacent cutting means 7 of the thin plates 5.

Figure 6:
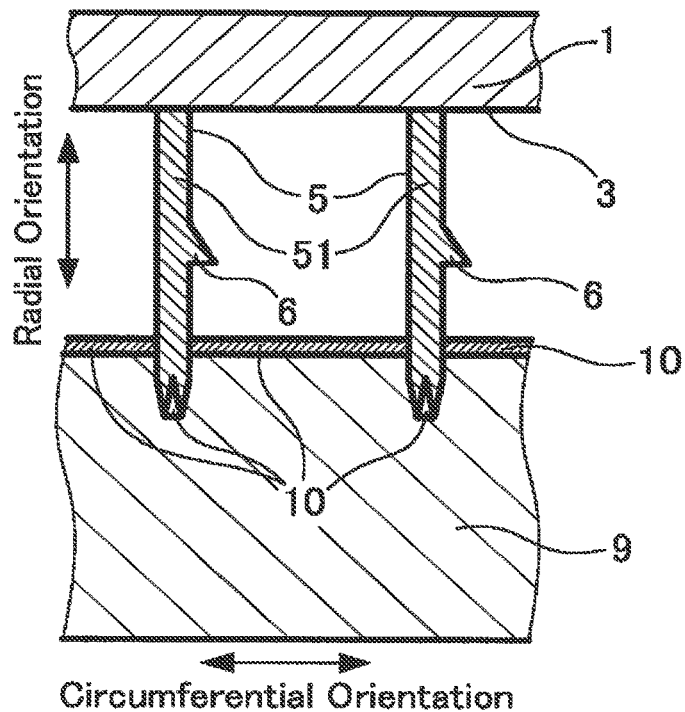
FIG. 6 is a view in cross section of a tire molding element and a green tire, schematically illustrating a step of the molding employing the tire molding element in FIG. 3.

Next, as a second step illustrated in FIG. 6, the molding element 1 is pushed forward and inwardly in the radial direction toward the green tire 9, and the covering layer 10 cut to a predetermined length in the first step is pushed forward together with the green tire 9 to the protrusion 6 protruding in the thickness direction of the thin plates 5 from the main body 51 of the thin plates 5. The covering layer 10 in the portion not pushed forward to the protrusion 6 remains between the two cutting means 7 provided on the thin plates 5.

Figure 7:
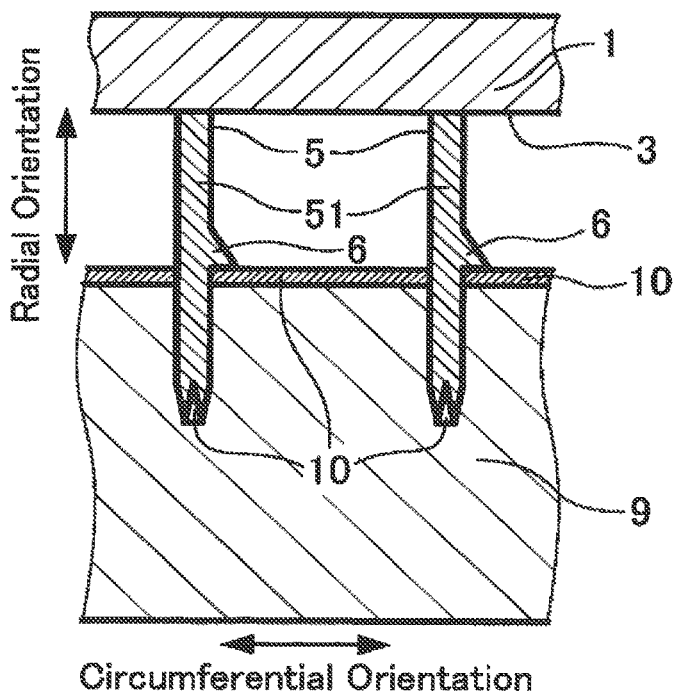
FIG. 7 is a view in cross section of a tire molding element and a green tire, schematically illustrating a step of the molding employing the tire molding element in FIG. 3.

Next, as a third step illustrated in FIG. 7, the molding element 1 is pushed further forward and inwardly in the radial direction toward the green tire 9, and the covering layer 10 cut to a predetermined length in the first step is pushed forward as far as the protrusion 6 protruding in the thickness direction of the thin plates 5.

Figure 8:
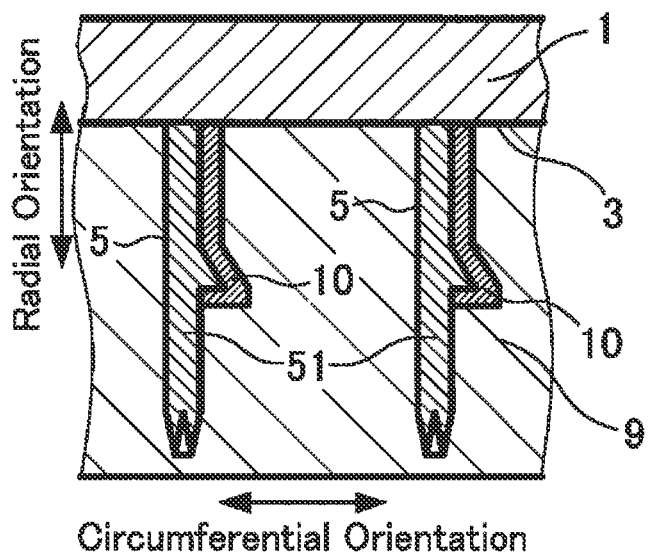
FIG. 8 is a view in cross section of a tire molding element and a green tire, schematically illustrating a step of the molding employing the tire molding element in FIG. 3.

In addition, as a fourth step illustrated in FIG. 8, the molding element 1 is pushed further forward inwardly in the radial direction toward the green tire 9, and the covering layer 10 cut to a predetermined length in the first step and pushed forward as far as the protrusion 6 protruding in the thickness direction of the thin plates 5, is guided in the depth direction of the green tire 9 by means of the protrusion 6 while sliding on the surface of the green tire 9 in such a way as to cover a part or all of the transverse side surface 44 of the ground contact element 4, and vulcanization molding is performed in this state.

The effect of the tire molding element according to the abovementioned first mode of embodiment will be described next.

With the tire molding element 1 according to this mode of embodiment, the thin plates 5 comprising the main body 51 are provided with the protrusion 6 that protrudes from the main body 51 of said thin plates 5 in the thickness direction of the thin plates 5, said thin plates 5 being provided in such a way as to cut the covering layer 10 without the use of the blade described in abovementioned Patent Documents 1 and 2 etc., so the cut covering layer 10 arranged in advance on the unvulcanized green tire 9 is guided in the green tire 9 depth direction by means of the protrusion 6 on the thin plates 5, and therefore it is possible to increase the degree of freedom in the arrangement of the covering layer 10 that covers the ground contact element 4 on the tire.

In addition, when the covering layer 10 arranged on the green tire 9 is cut by the at least two cutting means 7 separated in the thickness direction of the thin plates 5 and provided at an end portion of the thin plates 5 on the opposite side to the molding surface 3, it is possible to make slipping unlikely to occur between the covering layer 10 and the cutting means 7, so it is possible to cut the covering layer 10 more reliably to a predetermined length, and it is furthermore possible to reduce the risk of the covering layer 10 being dragged by the thin plate 5 on the wrong side, and therefore the covering layer 10 can be stably arranged at a predetermined position with greater reliability.

Furthermore, the cross-sectional shape of the protrusion 6 is substantially triangular, so the thin plates 5 provided with the protrusion 6 are easily detached from the tire after vulcanization molding, and as a result it is possible to mold a tire in which a part or all of the ground contact element 4 is covered by the covering layer 10, with greater stability.

It should be noted that Patent Document 3 describes the series of processes up to molding in such a way that the cut covering layer 10 is guided in the thickness direction of the green tire 9 and covers a part or all of the side surface 42 of the ground contact element 4 by virtue of the protrusion 6 protruding in the thickness direction of the thin plates 5 from the main body 51 of the thin plates 5.

A variant example of a mode of embodiment of the present disclosure will be described next.

The cutting means 7 provided on the thin plates 5 of the tire molding element 1 may have a saw blade shape in the width direction (=tire axial direction) of the thin plates 5, in which case the gap between the saw blades is preferably equal between the at least two cutting means 7 separated in the thickness direction of the thin plates 5, but said gap may equally be different.

Furthermore, the shape of the thin plates 5 may be modified in such a way that the incision 46 formed by the thin plates 5 in the ground contact element 4 has an arcuate shape, a serrated shape, or a combination of a serrated shape and straight lines, when seen in a plan view of the ground contact surface 43 of the ground contact element 4.

Furthermore, the protrusion 6 that protrudes in the thickness direction of the thin plates 5 may be formed in such a way as to be discontinuous from the main body 51 of the thin plates 5 in the width direction (tire axial direction) of the thin plates 5.

Figure 9:
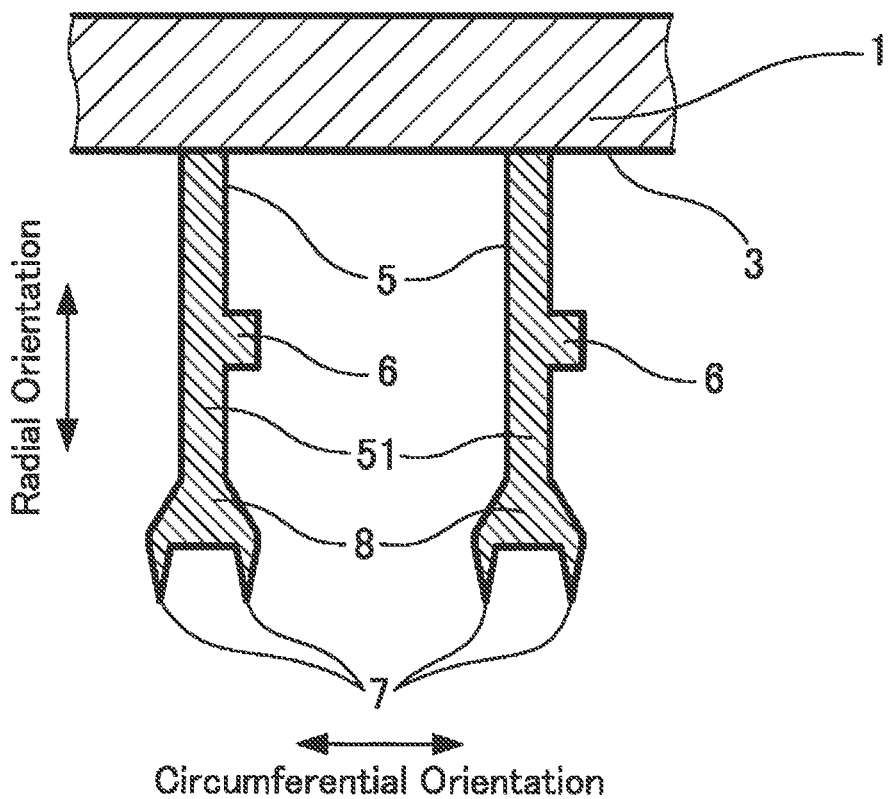
FIG. 9 is a view in cross section schematically illustrating a molding element according to a second mode of embodiment of the present disclosure.

A tire molding element according to a second mode of embodiment of the present disclosure will be described next with the aid of FIG. 9. FIG. 9 is a view in cross section schematically illustrating a tire molding element according to a second mode of embodiment of the present disclosure. In FIG. 9, in the same way as in FIG. 3, the direction of the arrows indicated by Circumferential Orientation denotes the tire circumferential direction (direction of rotation), and the direction of the arrows indicated by Radial Orientation denotes the tire radial direction. It should be noted that the description of the second mode of embodiment relates to structural elements which are different than those of the abovementioned first mode of embodiment, and structural elements which are the same will not be described again.

As illustrated in FIG. 9, the tire molding element 1 according to the second mode of embodiment is provided with the molding surface 3 intended for molding the tread 2, on a surface of the molding element 1 opposite the green tire 9 (see 3) vulcanization molded as a tire, in the same way as the tire molding element 1 according to the abovementioned first mode of embodiment. The thin plates 5 which extend in the radial direction toward the green tire 9, form the incisions 46 (see FIG. 2) in the ground contact element 4 (see FIG. 2) and comprise the main body 51 are provided on the molding surface 3, and the protrusion 6 having a substantially square cross section is provided in the region of an intermediate portion in the radial direction of the main body 51 of the thin plates 5, said protrusion 6 forming the notch 47 (see FIG. 2) in the ground contact element 4, protruding in the thickness direction (tire circumferential direction) of the thin plates 5, and being intended to guide the cut covering layer 10 (see FIG. 3) in the depth direction of the green tire 9 so that the covering layer 10 covers a part or all of the transverse side surface 42 of the ground contact element 4; the enlarged-width portion 8 having a substantially flask-shaped cross section is provided at an end portion of the thin plates 5 on the opposite side to the molding surface 3, and the two cutting means 7 separated in the thickness direction of the thin plates 5 and provided in such a way as to cut the covering layer 10 arranged in advance on the unvulcanized green tire 9 are further provided in such a way as to protrude from the enlarged-width portion. Moreover, in the second mode of embodiment also, the cutting means 7 are not limited to two cutting means, and three or more may be provided.

The two cutting means 7 separated in the thickness direction of the thin plates 5 and provided in such a way as to protrude from the enlarged-width portion 8 of the thin plates 5 are arranged in such a way that the maximum separation distance on each thin plate 5 of the two cutting means 7 in the thickness direction of the thin plates 5 is equal to or less than the width of the enlarged-width portion 8, and the maximum width of the enlarged-width portion 8 measured in the thickness directions of the thin plates 5 is provided in such a way as to be between 1.5 and 5 times the thickness of the thin plates 5.

The effect of the tire molding element according to the abovementioned second mode of embodiment will be described next.

In the tire molding element 1 according to the second mode of embodiment, the enlarged-width portion 8 is provided on the end portion of the thin plates 5 on the opposite side to the molding surface 3 and the two cutting means 7 protrude from the enlarged-width portion 8, so it is possible to maintain a distance between the at least two cutting means 7 separated in the thickness direction of the thin plates 5, and it is possible to make slipping less likely to occur between the covering layer 10 and the cutting means 7; as a result, it is possible to stably arrange the covering layer 10 at a predetermined position on the ground contact element 4 of the tire, with greater reliability. Furthermore, it is a simple matter to make a large number of cutting means 7 protrude, namely three or more cutting means.

The maximum separation distance on each tin plate 5 of the two cutting means 7 in the thickness direction of the thin plates 5 is equal to or less than the width of the enlarged-width portion 8, so it is possible to further reduce the risk of slipping being produced with the covering layer 10 by the cutting means 7, and it is possible to more reliably cut the covering layer 10 to a predetermined length so the covering layer 10 can be stably arranged at a predetermined position with greater reliability.

In addition, the maximum width of the enlarged-width portion 8 measured in the thickness direction of the thin plates 5 is set at between 1.5 and 5 times the thickness of the thin plates 5, and therefore a tire in which a part or all of the ground contact element 4 is covered by the covering layer 10 can be molded more stably. That is to say, if the maximum width of the enlarged-width portion 8 is more than five times the thickness of the thin plates 5, then it becomes difficult to separate the thin plates 5 provided with the enlarged-width portion 8 from the tire after vulcanization molding, and there is a risk of damaging the molding element 1; furthermore, if the maximum width of the enlarged-width portion 8 is less than 1.5 times the thickness of the thin plates 5, then the advantage of providing the enlarged-width portion 8 in the incision 44 when the tire is molded is reduced, and there is a risk of it not being possible to adequately demonstrate tire performance, so the maximum width of the enlarged-width portion of the thin plates is preferably in the abovementioned range.

In the ground contact element 4 of the tread 2 vulcanization molded using the tire molding element 1 according to the second mode of embodiment, a portion corresponding to a portion of the enlarged-width portion 8 interposed between the two cutting elements 7 provided in such a way as to protrude from the enlarged-width portion 8 provided at the end portion of the thin plates 5 on the opposite side to the molding surface 3, i.e. a radially inside portion of the incision 44 provided on the ground contact element 4 is also covered by the covering layer 10, and the covering layer 10 in this portion also serves as a layer for protecting a portion of the incision 44 on the inside in the tire radial direction.

Figure 10:
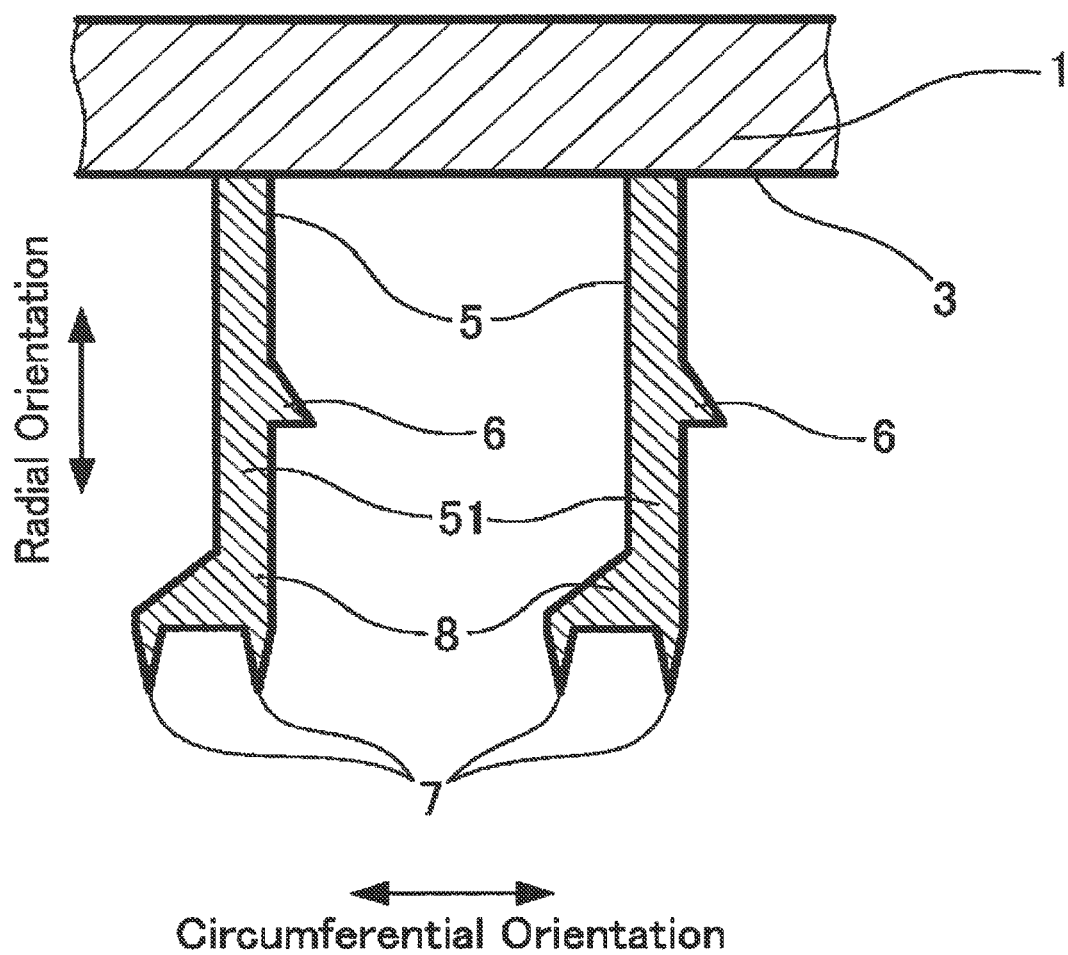
FIG. 10 is a view in cross section schematically illustrating a molding element according to a third mode of embodiment of the present disclosure.

A tire molding element according to a third mode of embodiment of the present disclosure will be described next with the aid of FIG. 10. FIG. 10 is a view in cross section schematically illustrating a tire molding element according to a third mode of embodiment of the present disclosure. In FIG. 10, in the same way as in FIG. 3, the direction of the arrows indicated by Circumferential Orientation denotes the tire circumferential direction (direction of rotation), and the direction of the arrows indicated by Radial Orientation denotes the tire radial direction. It should be noted that the description of the third mode of embodiment also relates to structural elements which are different than those of the abovementioned first and second modes of embodiment, and structural elements which are the same will not be described again.

As illustrated in FIG. 10, the tire molding element 1 according to the third mode of embodiment is provided with the molding surface 3 intended for molding the tread 2, on a surface of the molding element 1 opposite the green tire 9 vulcanization molded as a tire by means of the molding element 1, in the same way as the tire molding element 1 according to the abovementioned first and second modes of embodiment. The thin plates 5 which extend in the radial direction toward the green tire 9, form the incisions 44 in the ground contact element 4 and comprise the main body 51 are provided on the molding surface 3, and the protrusion 6 having a substantially square cross section is provided in the region of an intermediate portion in the radial direction of the main body 51 of the thin plates 5, said protrusion 6 forming the notch 45 in the ground contact element 4, protruding in the thickness direction (tire circumferential direction) of the thin plates 5, and being intended to guide the cut covering layer 10 in the depth direction of the green tire 9 so that the covering layer 10 covers a part or all of the transverse side surface 42 of the ground contact element 4; the enlarged-width portion 8 having a substantially triangular shape and protruding in the opposite direction to the direction of protrusion of the protrusion 6 from the main body 51 of the thin plates 5 is provided at the end portion of the thin plates 5 on the opposite side to the molding surface 3, and the two cutting means 7 separated in the thickness direction of the thin plates 5 and provided in such a way as to cut the covering layer 10 arranged in advance on the unvulcanized green tire 9 are provided in such a way as to protrude from the enlarged-width portion 8. Moreover, in the third mode of embodiment also, the cutting means 7 are not limited to two cutting means, and three or more may be provided.

The effect of the tire molding element according to the third mode of embodiment will be described next.

The tire molding element 1 according to the third mode of embodiment includes the enlarged-width portion 8 which protrudes in the opposite direction to the direction of protrusion of the protrusion 6 from the main body 51 of the thin plates 5, and therefore the covering layer 10 cut by means of the cutting elements 7 is reliably guided in the depth direction of the green tire 9 without being obstructed by the enlarged-width portion 8 and is also guided to the protrusion 6. As a result, the covering layer 10 can be stably arranged at a predetermined position with greater reliability.

Particularly preferred modes of embodiment of the present disclosure were described above, but the present disclosure is not limited to the modes of embodiment illustrated and a number of modifications and variations are possible within the scope of the patent claims.

The invention claimed is:

1. A tire molding element for vulcanization molding a tire tread, comprising:
   a molding surface for molding a plurality of ground contact elements of the tread, comprising a ground contact surface which contacts a road surface, and a transverse side surface and a circumferential side surface connected to said ground contact surface; and
   thin plates comprising a main body, provided in such a way as to cut a covering layer arranged in advance on an unvulcanized green tire,
   at least one thin plate comprises a protrusion which protrudes from the main body in the thickness direction of the at least one thin plate and guides the cut covering layer in the depth direction of the green tire in such a way as to cover at least a portion of the transverse side surface of the ground contact element,
   the at least one thin plate comprises at least two cutting means separated in the thickness direction of the at least one thin plate, at an end portion on the opposite side to the molding surface;
   the at least one thin plate comprising an enlarged-width portion at the end portion on the opposite side of the molding surface, and the cutting means protruding from the enlarged-width portion; and
   the enlarged-width portion of the at least one thin plate protrudes in the opposite direction to the direction of protrusion of the protrusion from the main body of the at least one thin plate.

2. The tire molding element according to claim 1, wherein the cross-sectional shape of the protrusion of the at least one thin plate is substantially triangular.

3. A tire vulcanization mold, comprising at least one tire molding element according to claim 1.

4. A method for manufacturing a tire, comprising vulcanizing said tire via the tire vulcanization mold according to claim 3.

* * * * *